(12) United States Patent
Chao

(10) Patent No.: US 6,481,778 B1
(45) Date of Patent: Nov. 19, 2002

(54) DASHBOARD HEIGHT-ADJUSTING APPARATUS

(75) Inventor: Hsien Ta Chao, Taipei (TW)

(73) Assignee: Kiwi Auto Accessories Co., Ltd., Taipei Hsien (TW)

( * ) Notice: Subject to any disclaimer, the term of this patent is extended or adjusted under 35 U.S.C. 154(b) by 28 days.

(21) Appl. No.: 09/944,393

(22) Filed: Sep. 4, 2001

(51) Int. Cl.[7] ............................................. B62D 25/14
(52) U.S. Cl. ............................ 296/70; 296/74; 180/90
(58) Field of Search ............................ 296/70, 74, 72; 180/90; 220/3.7

(56) References Cited

U.S. PATENT DOCUMENTS

| 758,754 | A | * | 5/1904 | Hollingsworth | 296/74 |
| 891,027 | A | * | 6/1908 | Alright | 296/74 |
| 4,943,107 | A | * | 7/1990 | Rhodes, Jr. | 296/70 |

FOREIGN PATENT DOCUMENTS

DE 4134436 A1 * 4/1992 ........... B62D/25/04

* cited by examiner

*Primary Examiner*—D. Glenn Dayoan
*Assistant Examiner*—Lori L Coletta
(74) *Attorney, Agent, or Firm*—Rosenberg, Klein & Lee

(57) ABSTRACT

A dashboard height-adjusting apparatus, used for the adjustment of the assembly of upper and lower units of the dashboard, the upper unit having a plurality of fastening hooks and the lower unit having a plurality of assembling sockets for engagement, the assembling socket received in the dashboard height-adjusting apparatus. The dashboard height-adjusting apparatus comprises a hook. unit formed at the bottom part of the height-adjusting apparatus, the hook unit folded horizontally to hook onto the lower edge of the wall side of the assembling socket; an extended section extending vertically from the hook unit; a covering section extending horizontally from the top of the extended section, the covering section being parallel to the hook unit and covering the upper edge of the wall side of the assembling socket; and a hook section being a flexible element and extending vertically and downwardly from the covering section in order to engage with the lower edge of the fastening hook of upper unit. When the fastening hook of the upper unit is inserted into the assembling socket of the lower unit, the end of the fastening hook would be locked with the lower edge of the hook section, so that the fastening hook can be securely fastened to the dashboard height-adjusting apparatus.

5 Claims, 7 Drawing Sheets

DASHBOARD HEIGHT-ADJUSTING APPARATUS

BACKGROUND OF THE INVENTION

1. Field of the Invention

This invention relates to a dashboard height-adjusting apparatus, particularly to an apparatus for adjusting assembled height of dashboard and fastening assembly.

2. Background of the Invention

The dashboard is an essential device indicating how all systems are functioning in a car, such as traveling speed, mileage, oil gauge, battery power, lighting, computer detection, and such functions, which are essential reference guides for the motorist who tries to control the fast-moving car. Therefore, the installation of the dashboard can have direct influence to the car performance and interior decoration inside the car.

FIG. 9 shows the classic type of dashboard, wherein the dashboard A comprises an upper unit A1 and a lower unit A2. The upper unit A1 and the lower unit A2 respectively contain a panel and gauges, indicating the car speed or other functional references. The upper unit A1 has several fastening hooks A1', while the lower unit A2 has several assembling sockets A2'. By matching the fastening hooks A1' and the assembling sockets A2', the upper unit A1 and the lower unit A2 can be assembled (shown in FIGS. 10 and 11) and installed in front of the steering wheel.

Cars of different models or brands have different assembled heights H of the dashboard (shown in FIGS. 9 and 10). In other words, different molds have to be made for different dashboards with different assembled heights H between the upper unit A1 and lower unit A2 in cars of different models or brands. Remodeling or modifications must be made in cars of similar models. In case the assembled height H between the upper unit A1 and lower unit A2 of the dashboard A must be lengthened or shortened, a mold must be made separately for the dashboard A of such a different assembled height H, resulting in inconvenience and difficulty in the assembly and installation of the dashboard A. At the same time, it causes increased production costs of the entire car, and much difficulty in subsequent replacement of the dashboard.

BRIEF DESCRIPTION OF THE INVENTION

The primary objective of this invention is to provide a dashboard height-adjusting apparatus, for free adjustment of the assembled height between the upper unit and lower unit of the dashboard, without having to make new molds for the production of a separate dashboard.

The second objective of this invention is to provide a dashboard height-adjusting apparatus, which can be directly used on the dashboard of cars of different models, because it has a wide range of applications adaptable to all models.

The third objective of the invention is to provide a dashboard height-adjusting apparatus, which reduces the assembling costs of the dashboard, and significantly reduces the costs for remodeling the interior of a car.

According to the invention, the dashboard height-adjusting apparatus is a flexible body, with its bottom being folded horizontally to have a hook unit for hooking onto the lower edge of wall side of assembling socket of the lower unit. Extended vertically upward from the hook unit is an extended section with a length equivalent to the height of the assembling socket of the lower unit. Extended horizontally from the top of the extended section is a covering section, used to cover the upper edge of wall side of the assembling socket. And, extended vertically downward from the covering section is a hook section; on its surface is at least a flexible unit. The length of the hook section and the position of the flexible unit are the clearance and height of the assembled upper unit and lower unit. When the fastening hook of the upper unit is fastened to the assembling socket of the lower unit, it can be fastened to the flexible unit, and that the assembled height of the upper unit and lower unit of the dashboard can be adjusted.

The drawings of preferred embodiments of this invention are described in following details to enable better understanding.

DETAILED DESCRIPTION OF PREFERRED EMBODIMENTS

Figure 1:
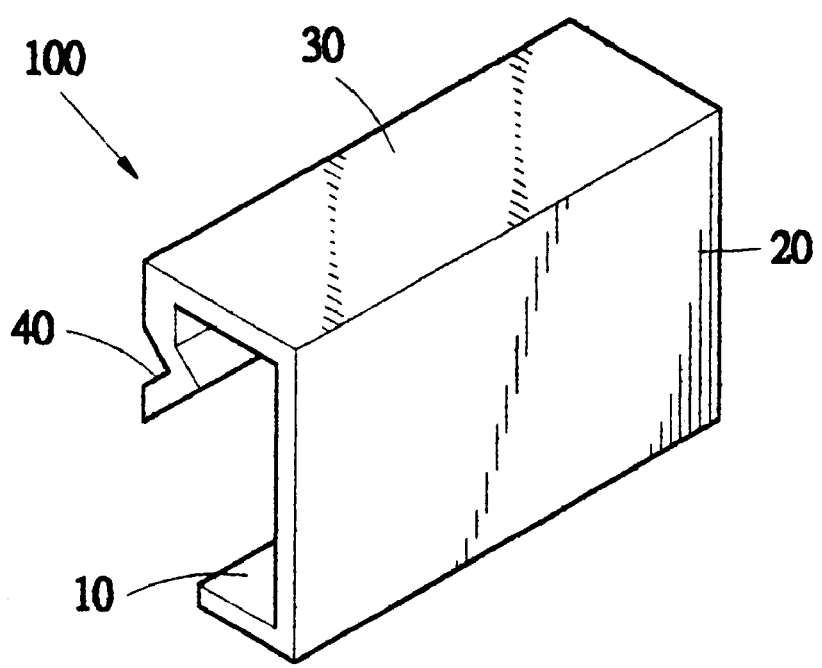
FIG. 1 is a perspective view of the dashboard height-adjusting apparatus of the invention.

As shown in FIG. 1, as well as in all the drawings, the numeral 100 is used to indicate the dashboard height-adjusting apparatus of the invention, while the numeral 200 is used to indicate a car dashboard. The dashboard height-adjusting apparatus 100 is a flexible body. The dashboard 200 comprises an upper unit 210 having an eave wall 212 and a plurality of fastening hooks 211 downwardly extending and a lower portion 220 having a plurality of assembling sockets 221. The assembling socket 221 is received in the dashboard height-adjusting apparatus 100. The bottom part of the apparatus 100 is folded horizontally to form a hook unit 10. An extended section 20 is extended vertically and upwardly from the hook unit 10. The length of the extended section 20 is equivalent to the height of an assembling socket 221 (shown in FIG. 3) of the lower unit 220. A covering section 30 is extended horizontally from the top of the extended section 20. The covering section 30 is parallel to the hook unit 10. A hook section 40 is extended vertically and downward from the covering section 30. The hook section 40 is a flexible element and shaped to curve inwardly to become an arch with flexibility to fold in or stretch out. The length of the hook section 40 will directly determine and adjust the assembled height between the upper unit 210 and lower unit 220 of the dashboard 200.

Figure 2:
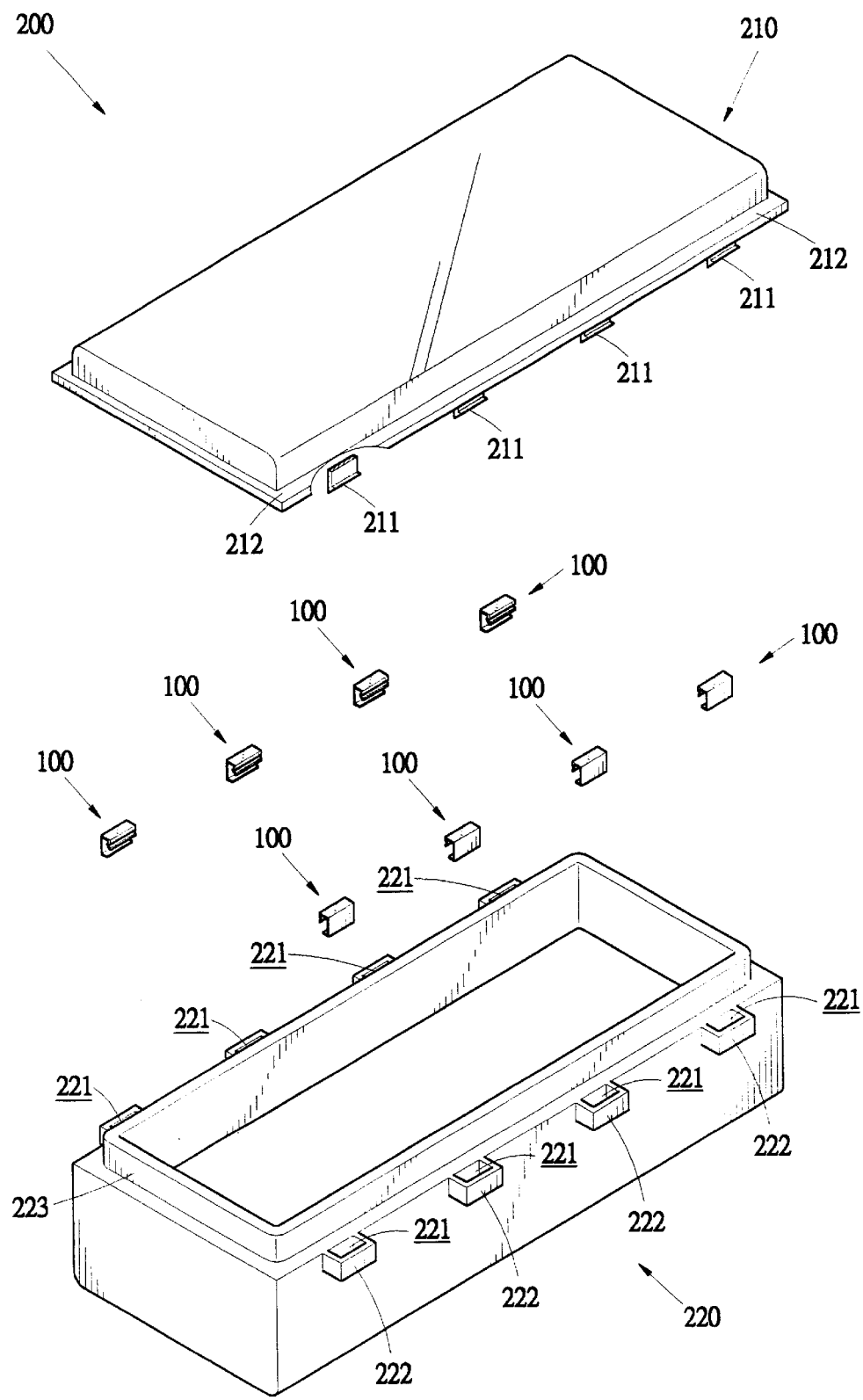
FIG. 2 is a perspective view of a preferred embodiment of the invention, showing the dashboard height-adjusting apparatus used to assembly the upper unit and lower unit of the dashboard.
Figure 3:
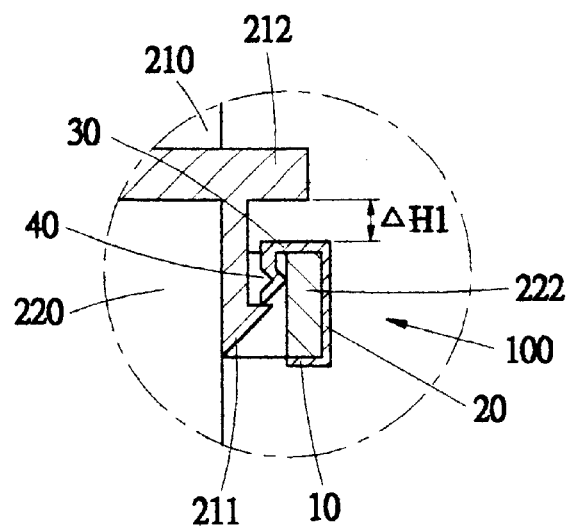
FIG. 3 is a partial enlarged cross-sectional view, showing dashboard height-adjusting apparatus being assembled between the upper unit and lower unit of a dashboard.
Figure 4:
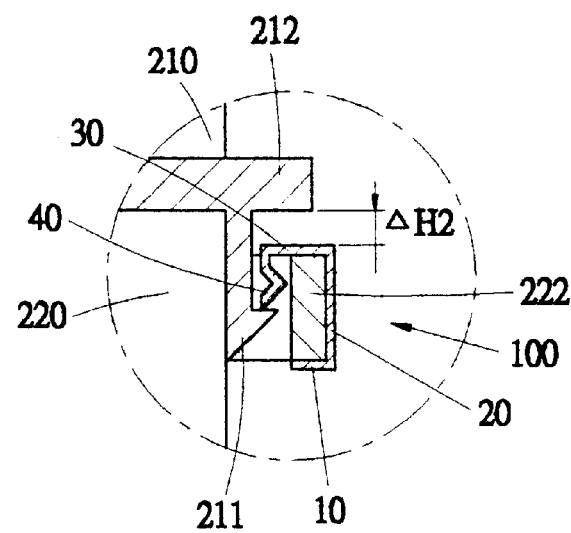
FIG. 4 is a partial enlarged cross-sectional view similar to FIG. 3 and shows the height to be adjusted.

As shown in FIGS. 2, 3 and 4, showing how the dashboard height-adjusting apparatus 100 shown in FIG. 1 is applied to the adjustment of height between the upper unit 210 and lower unit 220 of a dashboard 200. The hook units 10 hooks onto the lower edge of the wall 222 of each assembling socket 221 around the top of the lower unit 220. The covering section 30 covers the upper edge of the wall 222 of the assembling socket 221. The dashboard height-adjusting apparatus 100 is fixed onto the assembling socket 221 of the lower unit 220 (shown in FIGS. 3 and 4). Then, the fastening hooks 211 on the upper unit 210 inserts respectively into the assembling sockets 221. Please note that the hook section 40 of the dashboard height-adjusting apparatus 100 is a flexible element. Therefore, the fastening hook 211 can be gradually inserted into the assembling socket 221 alone the hook section 40. The end of the fastening hook 211 would be locked with the lower edge of the hook section 40 (as shown in FIG. 4) so that the fastening hook 211 would be securely fastened to the dashboard height-adjusting apparatus 100.

As described above, after the fastening hook 211 of the upper unit 210 is fastened to the dashboard height-adjusting apparatus 100, there is a difference in height ΔH1, ΔH2 (shown in FIGS. 3 and 4) between the covering section 30 and the eaves wall 210 of the upper unit 210. The formation of the differences in height ΔH1, ΔH2 is the result of the combination of the length of the fastening hook 211 and the hook section 40. The adjustment of the length of the hook section 40 will result in the adjustment of different differences in height ΔH1, ΔH2. In other words, the assembled height between the upper unit 210 and lower unit 220 of the dashboard 200 can be adjusted by adjusting the dashboard height-adjusting apparatus 100. The range of adjustment of the differences in height ΔH1, ΔH2 is not limited. For the sake of good appearance, however, the maximum height in the preferred embodiment shall not be more than the edge 223 (shown in FIG. 2) of the lower unit 220. Using different dashboard height-adjusting apparatus with different length of extended sections 20, the assembled height of dashboard of various models and brands can be accurately and freely adjusted by directly fitting the dashboard height-adjusting apparatus 100. It is not necessary to make new molds or structural modifications.

Figure 5:
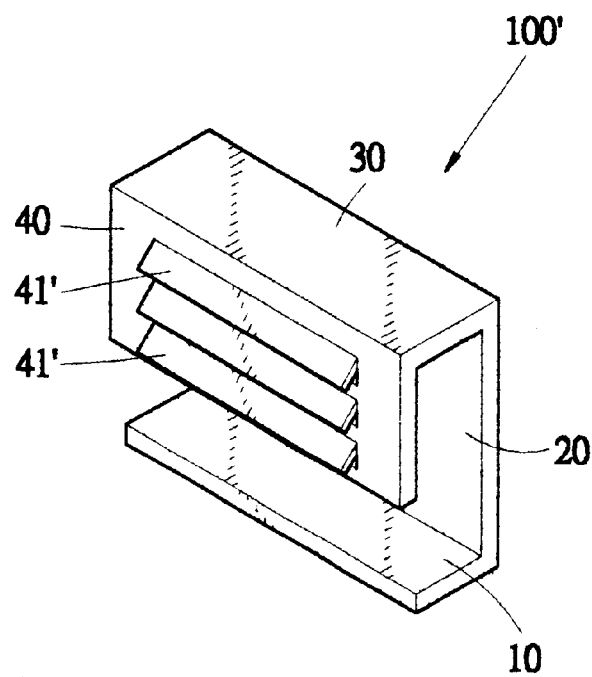
FIG. 5 is another embodiment of the dashboard height-adjusting apparatus of the invention.
Figure 6:
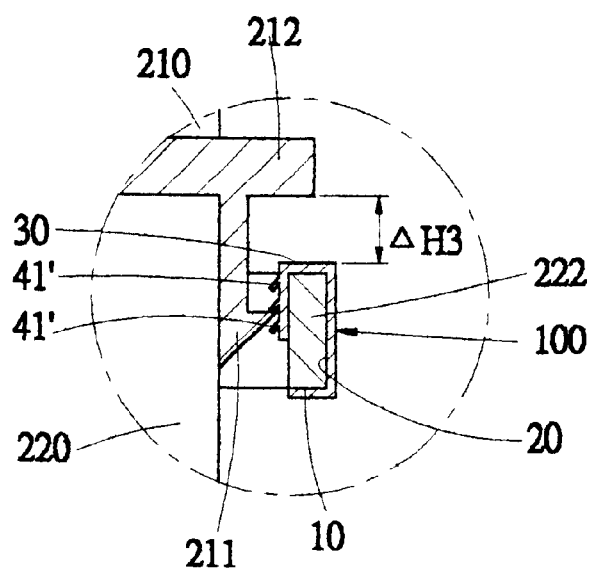
FIG. 6 is a partial enlarged cross-sectional view of the dashboard height-adjusting apparatus of the embodiment shown in FIG. 5 and shows dashboard height-adjusting apparatus being assembled between the upper unit and lower unit of a dashboard.

FIGS. 5 and 6 illustrate another preferred embodiment of the dashboard height-adjusting apparatus 100'. The difference between this embodiment and that shown in FIGS. 1 to 4 lies in that, at a different height of the hook section 40 is sequentially installed a plurality of flexible units 41', which is composed of a triangular block that is obliquely compressed, having an unspecified clearance. By engaging the fastening hook 211 of the upper unit 210 with the flexible unit 41' with a different height, the fastening hook 211 reaches into the assembling socket at a different depth, so that the resulting difference in height ΔH3 is also different. In other words, the installation of such flexible unit 41' enables the function of adjustment of various different heights to the dashboard height-adjusting apparatus 100', so that it can be applied to the adjustment of assembled height of different dashboards 200 of different models. That is a feature enabling a wide range of applications of the dashboard height-adjusting apparatus 100' of the invention, which can be assembled to different dashboard.

Figure 7:
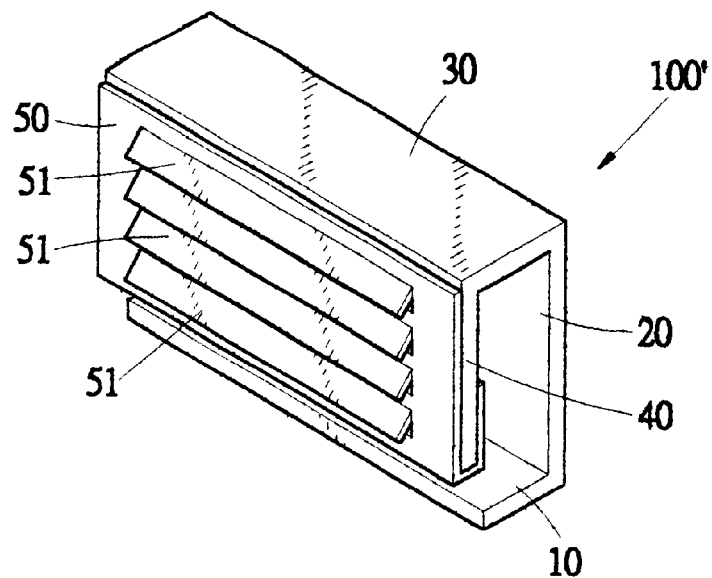
FIG. 7 is a further embodiment of the dashboard height-adjusting apparatus of the invention.
Figure 8:
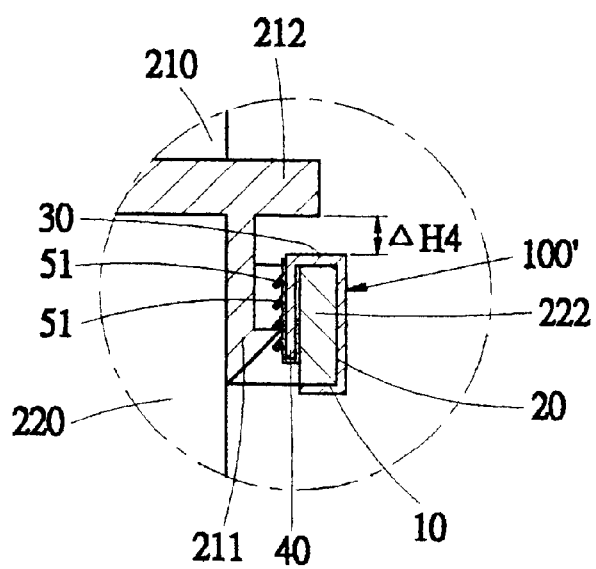
FIG. 8 is a partial enlarged cross-sectional view of the dashboard height-adjusting apparatus of the embodiment shown in FIG. 7 and shows dashboard height-adjusting apparatus being assembled between the upper unit and lower unit of a dashboard.
Figure 9:
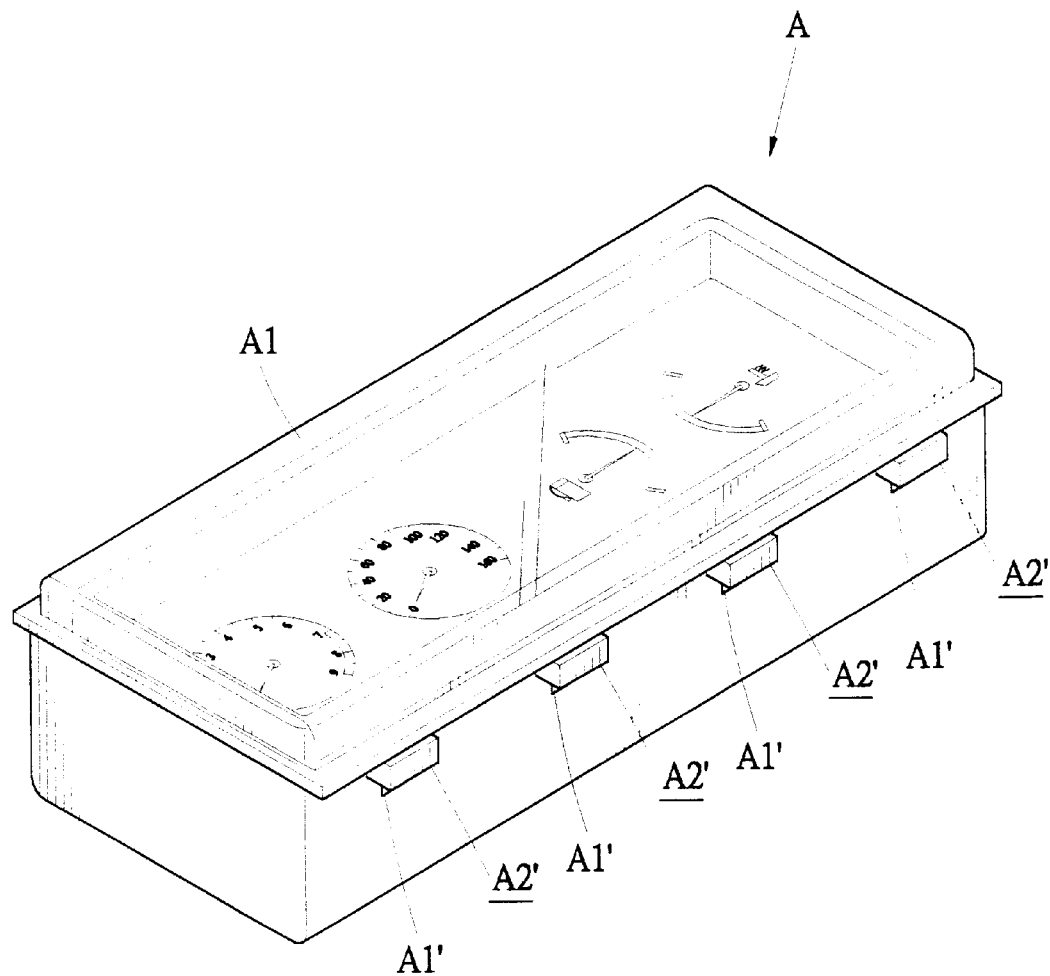
FIG. 9 is a perspective view of conventional dashboard.
Figure 10:
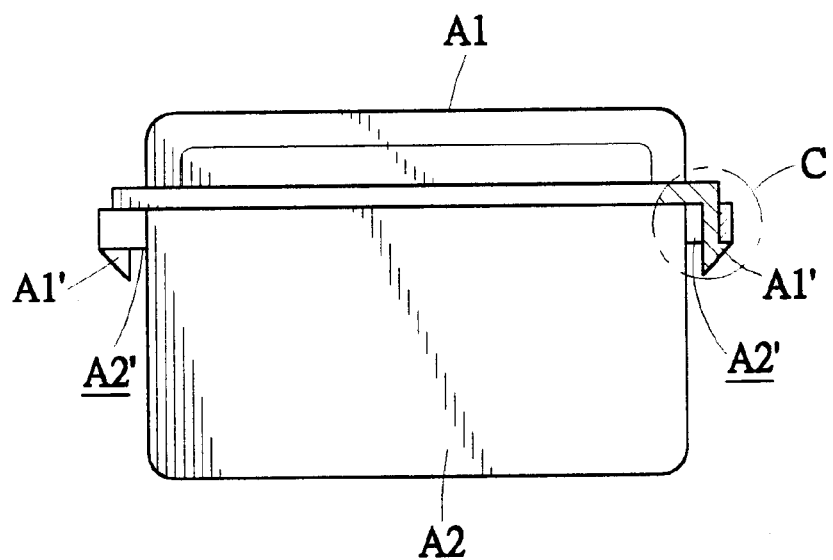
FIG. 10 shows the upper and lower unit of convention dashboard engaged together.
Figure 11:
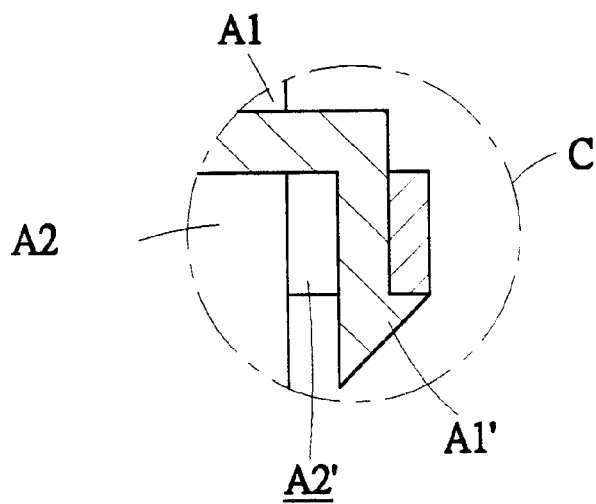
FIG. 11 in an enlarged cross-sectional view, showing the "C" portion as shown in FIG. 10.

FIGS. 7 and 8 illustrate a third preferred embodiment of the dashboard height-adjusting apparatus. Compared with the previous two embodiments shown in FIGS. 1 through 6, the dashboard height-adjusting apparatus 100' has no flexible unit 41' on the hook section 40. Instead, a U-shaped section 50 is mounted to the book section 40. The U-shaped section 50 has a plurality of flexible units 51 at different heights. When the fastening hook 211 of the upper unit 210 is inserted in the assembling socket 211, the fastening hook 211 is hooked onto the flexible unit 51 at a different height, thereby the difference in height ΔH4, formed between the eaves wall 212 of the upper unit 210 and the covering section 30, can be adjusted. The dashboard height-adjusting apparatus 100' can be used to adjust the assembled height of dashboard 200 of different models.

The dash board height-adjusting apparatus of the invention shown in FIGS. 1 through 8 is designed to be the most simplified component at the lowest cost, so that it can be used in the assembly of car dashboards requiring different height combinations, without having to make new molds for the dashboards, thereby significantly reducing the cost of production of dashboards, as well as cost of assembly onto cars:

What is claimed is:

1. A dashboard height-adjusting apparatus, used for the adjustment of the assembly of upper and lower units of the dashboard, the upper unit having a plurality of fastening hooks and the lower unit having a plurality of assembling sockets for engagement, the assembling socket received in the dashboard height-adjusting apparatus, wherein:

a hook unit is formed at the bottom part of the height-adjusting apparatus, the hook unit is folded horizontally to hook onto the lower edge of the wall side of the assembling socket;

an extended section extends vertically from the hook unit;

a covering section extends horizontally from the top of the extended section, the covering section is parallel to the hook unit and covers the upper edge of the wall side of the assembling socket;

and a hook section is a flexible element and extends vertically and downwardly from the covering section in order to engage with the lower edge of the fastening hook of upper unit.

2. The dashboard height-adjusting apparatus as claimed in claim 1, wherein the flexible unit of the hook unit is curved inwardly to form a flexible element.

3. The dashboard height-adjusting apparatus as claimed in claim 1, wherein the flexible unit of said hook unit further comprises a plurality of triangular blocks for engagement with the fastening hook of upper unit.

4. The dashboard height-adjusting apparatus as claimed in claim 1, further comprising a U-shaped section which has a plurality of flexible units, so that the fastening hook of the upper unit can be inserted to the assembling socket and secured to the flexible unit.

5. The dashboard height-adjusting apparatus as claimed in claim 4, wherein the flexible unit of the U-shaped section is an obliquely compressed triangular block.

* * * * *